United States Patent
Choudhary et al.

(10) Patent No.: US 8,271,885 B2
(45) Date of Patent: Sep. 18, 2012

(54) USER INTERFACE CUSTOMIZATION USING EVALUATION DATA

(75) Inventors: Samar Choudhary, Durham, NC (US);
Richard A. King, Durham, NC (US);
Vijay Pandiarajan, Durham, NC (US);
Niraj D. Patel, Rochester, MN (US);
Shikha Srivastava, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 12/483,320

(22) Filed: Jun. 12, 2009

(65) Prior Publication Data

US 2010/0318920 A1 Dec. 16, 2010

(51) Int. Cl.
*G06F 3/00* (2006.01)
(52) U.S. Cl. .................. 715/744; 715/764; 715/747
(58) Field of Classification Search .................. 715/700, 715/733, 744, 749, 760, 762, 747; 711/168, 711/174
See application file for complete search history.

(56) References Cited

U.S. PATENT DOCUMENTS

| | | | |
|---|---|---|---|
| 6,804,332 B1 * | 10/2004 | Miner et al. | 379/88.13 |
| 2005/0038867 A1 | 2/2005 | Henderson et al. | |
| 2007/0006136 A1 * | 1/2007 | Hirschberg et al. | 717/105 |
| 2007/0198946 A1 * | 8/2007 | Viji et al. | 715/779 |
| 2007/0283368 A1 | 12/2007 | Tsuji et al. | |
| 2009/0222516 A1 * | 9/2009 | Holmes et al. | 709/204 |
| 2009/0265760 A1 * | 10/2009 | Zhu et al. | 726/3 |
| 2010/0138316 A1 * | 6/2010 | Connors et al. | 705/27 |

OTHER PUBLICATIONS

Apple Downloads—http://www.apple.com/downloads/dashboard/,"DASHBOARD WIDGETS-Amazing Widgets for Your Mac OS X Dashboard", Feb. 17, 2009, 2 pages.

* cited by examiner

*Primary Examiner* — Xiomar L Bautista
(74) *Attorney, Agent, or Firm* — Cuenot, Forsythe & Kim, LLC

(57) ABSTRACT

A customized user interface is configured to include one or more user interface gadgets provided by one or more user interface gadget providers. Multiple possible user interface gadgets are identified for inclusion in the user interface by comparing a set of required attributes for the user interface to stored attribute data for a plurality of registered user interface gadgets. One or more of the possible user interface gadgets is selected for inclusion in the user interface using stored evaluation data for the possible user interface gadgets. Data related to the selected user interface gadget(s) is provided for use in generating the customized user interface on a computer system.

20 Claims, 3 Drawing Sheets

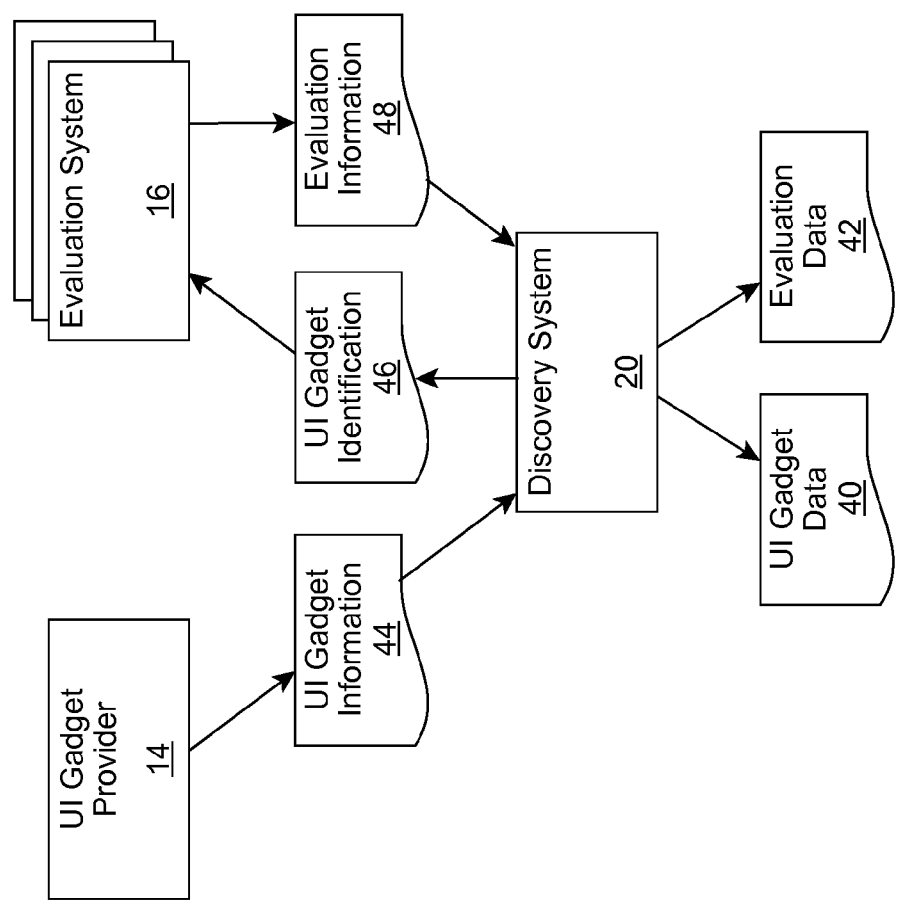

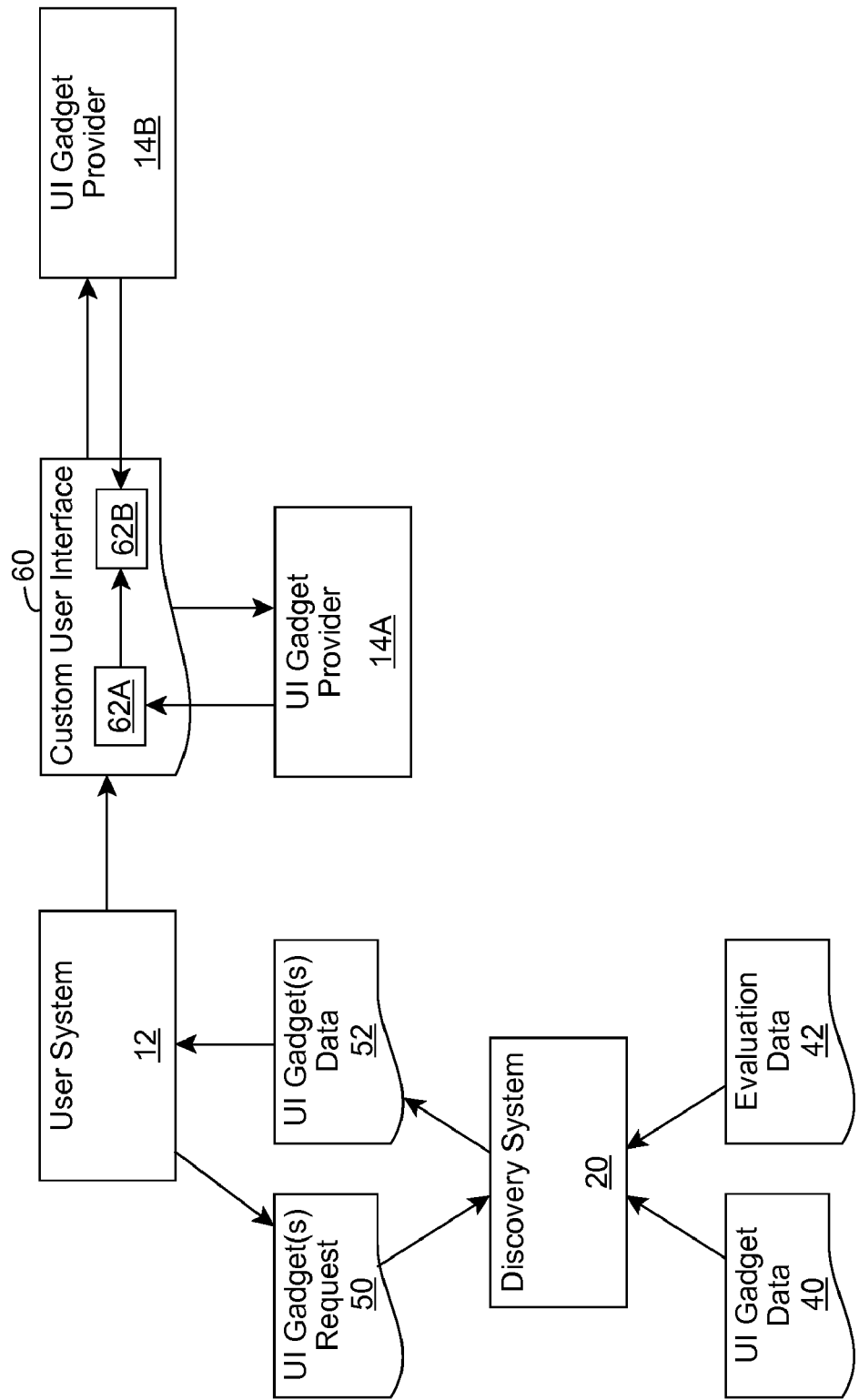

USER INTERFACE CUSTOMIZATION USING EVALUATION DATA

TECHNICAL FIELD

The disclosure relates generally to client-side mashup, and more particularly, to a solution for generating a customized user interface for presentation to a user using evaluation data.

BACKGROUND ART

The world wide web is moving from a Web 1.0 paradigm, in which content is static, to a Web 2.0 paradigm, in which content is user-generated and applications are executed over the web. Additionally, the Web 2.0 paradigm has introduced tagging, which allows metadata to be associated with a piece of information. As part of the movement to the Web 2.0 paradigm, more end users are using software as a service (SaaS) where they have an ability to compose disparate user interface (UI) gadgets from multiple websites and have the UI gadgets communicate with each other. For example, a UI gadget that displays a list of servers can communicate with another UI gadget that displays a map providing the location of any server in the list of servers. Potentially, these UI gadgets may be provided by two different vendors, but their combination provides for a very useful service. This is popularly known as client-side mashup. An end user can create a client-side mashup using a page customizer that allows the end user to drag and drop known UI gadgets to create the UI service.

SUMMARY OF THE INVENTION

Aspects of the invention provide configuration of a customized user interface to include one or more user interface gadgets provided by one or more user interface gadget providers. Multiple possible user interface gadgets are identified for inclusion in the user interface by comparing a set of required attributes for the user interface to stored attribute data for a plurality of registered user interface gadgets. One or more of the possible user interface gadgets is selected for inclusion in the user interface using stored evaluation data for the possible user interface gadgets. Data related to the selected user interface gadget(s) is provided for use in generating the customized user interface on a computer system.

A first aspect of the invention provides a computer-implemented method of configuring a customized user interface, the method comprising: identifying a plurality of possible user interface gadgets for inclusion in the user interface using a first computer system, wherein the identifying compares a set of required attributes for the user interface to stored attribute data for a plurality of registered user interface gadgets; selecting at least one user interface gadget for inclusion in the user interface from the plurality of possible user interface gadgets using the first computer system, wherein the selecting uses stored evaluation data for the plurality of possible user interface gadgets; and providing data related to the selected at least one user interface gadget for use in generating the customized user interface on a second computer system distinct from the first computer system.

A second aspect of the invention provides a computing environment for configuring a customized user interface, the environment comprising: a first computer system including: a component configured to identify a plurality of possible user interface gadgets for inclusion in the customized user interface, wherein the component configured to identify is configured to compare a set of required attributes for the customized user interface to stored attribute data for a plurality of registered user interface gadgets; a component configured to select at least one user interface gadget for inclusion in the customized user interface from the plurality of possible user interface gadgets, wherein the component configured to select is configured to use stored evaluation data for the plurality of possible user interface gadgets; and a component configured to provide data related to a selected at least one user interface gadget for use in generating the customized user interface on a second computer system distinct from the first computer system.

A third aspect of the invention provides a computer program comprising program code embodied in at least one computer-readable medium, which when executed, enables a first computer system to implement a method of configuring a customized user interface, the method comprising: identifying a plurality of possible user interface gadgets for inclusion in the customized user interface, wherein the identifying compares a set of required attributes for the customized user interface to stored attribute data for a plurality of registered user interface gadgets; selecting at least one user interface gadget for inclusion in the customized user interface from the plurality of possible user interface gadgets, wherein the selecting uses stored evaluation data for the plurality of possible user interface gadgets; and providing data related to the selected at least one user interface gadget for use in generating the customized user interface on a second computer system distinct from the first computer system.

A fourth aspect of the invention provides a method of generating a computing environment for configuring a customized user interface, the method comprising: providing a first computer system operable to: identify a plurality of possible user interface gadgets for inclusion in the customized user interface, wherein the identifying compares a set of required attributes for the customized user interface to stored attribute data for a plurality of registered user interface gadgets; select at least one user interface gadget for inclusion in the customized user interface from the plurality of possible user interface gadgets, wherein the selecting uses stored evaluation data for the plurality of possible user interface gadgets; and provide data related to the selected at least one user interface gadget for use in generating the customized user interface on a second computer system distinct from the first computer system.

A fifth aspect of the invention provides a method comprising: at least one of providing or receiving a copy of a computer program that is encoded in a set of data signals, wherein the computer program enables a computer system to implement a method of configuring a customized user interface, the method comprising: identifying a plurality of possible user interface gadgets for inclusion in the user interface using the first computer system, wherein the identifying compares a set of required attributes for the user interface to stored attribute data for a plurality of registered user interface gadgets; selecting at least one user interface gadget for inclusion in the user interface from the plurality of possible user interface gadgets using the first computer system, wherein the selecting uses stored evaluation data for the plurality of possible user interface gadgets; and providing data related to the selected at least one user interface gadget for use in generating the customized user interface on a second computer system distinct from the first computer system.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 2 shows an illustrative data flow diagram for managing data regarding a user interface gadget according to an embodiment.

FIG. 3 shows an illustrative data flow diagram for generating a customized user interface according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
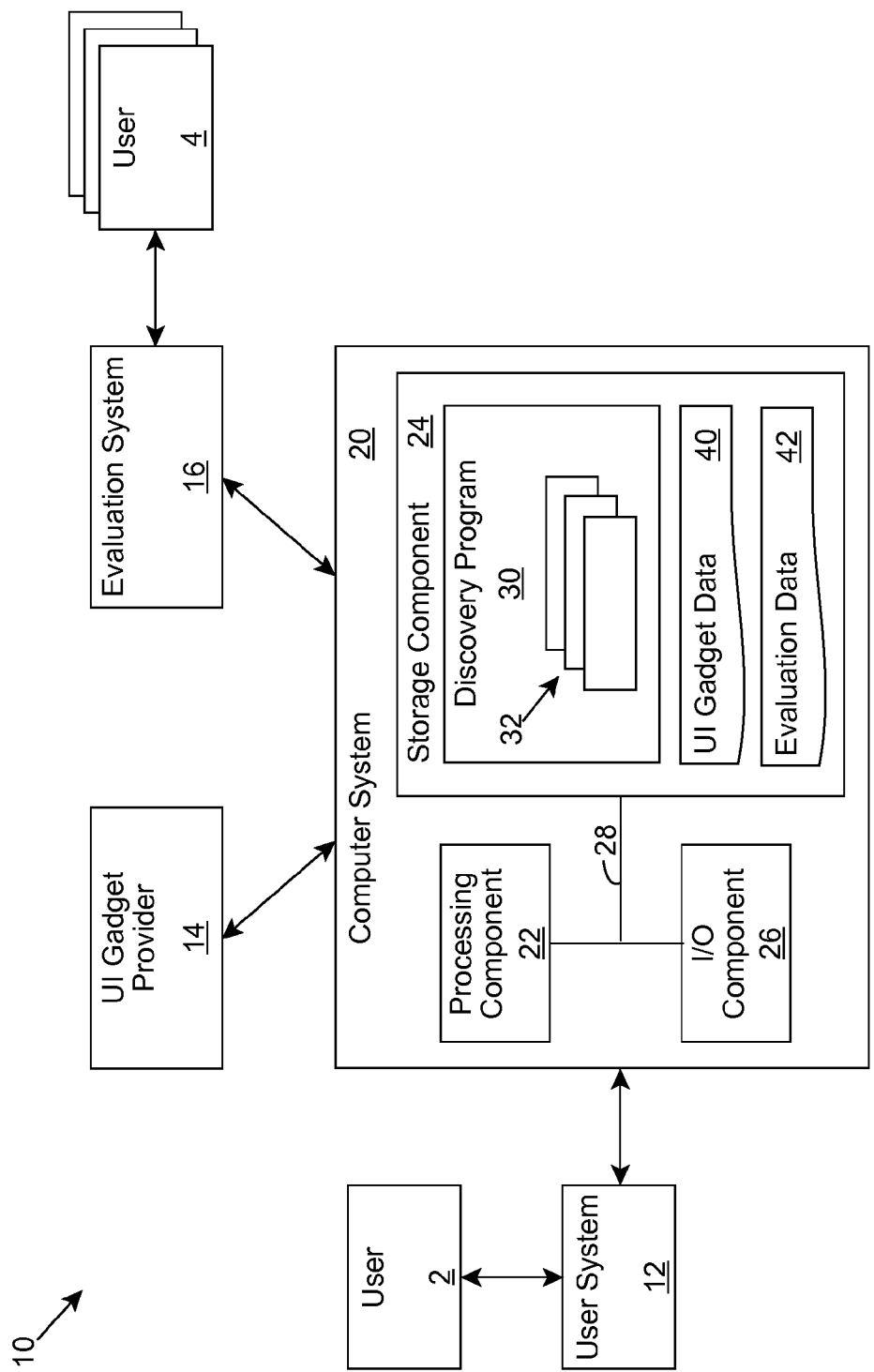
FIG. 1 shows an illustrative environment for generating a customized user interface according to an embodiment.

As indicated above, aspects of the invention provide configuration of a customized user interface to include one or more user interface gadgets provided by one or more user interface gadget providers. Multiple possible user interface gadgets are identified for inclusion in the user interface by comparing a set of required attributes for the user interface to stored attribute data for a plurality of registered user interface gadgets. One or more of the possible user interface gadgets is selected for inclusion in the user interface using stored evaluation data for the possible user interface gadgets. Data related to the selected user interface gadget(s) is provided for use in generating the customized user interface on a computer system. In this manner, a computer system, or a user thereof, can access a single location to identify possible user interface gadgets provided by numerous user interface gadget providers. Additionally, the user interface gadget(s) that are evaluated as performing the best can be automatically selected for inclusion in the user interface from all of the user interface gadget(s) that perform the desired functions. Further, an embodiment of the invention does not require an end user to have any prior knowledge of the user interface gadget(s), the corresponding provider(s), or evaluations thereof from other users in a network, such as the Internet. As used herein, unless otherwise noted, the term "set" means one or more (i.e., at least one) and the phrase "any solution" means any now known or later developed solution.

Turning to the drawings, FIG. 1 shows an illustrative environment 10 for generating a customized user interface according to an embodiment. To this extent, environment 10 includes a computer system 20 that can perform a process described herein in order to configure the customized user interface by selecting one or more user interface gadgets for inclusion in the user interface based on evaluation data for multiple possible user interface gadgets. In particular, computer system 20 is shown including a discovery program 30, which makes computer system 20 operable to provide data for generating the customized user interface for processing by user system 12 by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as discovery program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user to interact with computer system 20 and/or one or more communications devices to enable a system user, such as user system 12, to communicate with computer system 20 using any type of communications link. To this extent, discovery program 30 can manage a set of interfaces (e.g., graphical user interface(s), application program interface(s), and/or the like) that enable human and/or system users to interact with discovery program 30. Further, discovery program 30 can manage (e.g., store, retrieve, create, manipulate, organize, present, etc.) the data, such as user interface (UI) gadget data 40 and/or evaluation data 42, using any solution.

In any event, computer system 20 can comprise one or more general purpose computing articles of manufacture (e.g., computing devices) capable of executing program code, such as discovery program 30, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, discovery program 30 can be embodied as any combination of system software and/or application software.

Further, discovery program 30 can be implemented using a set of modules 32. In this case, a module 32 can enable computer system 20 to perform a set of tasks used by discovery program 30, and can be separately developed and/or implemented apart from other portions of discovery program 30. As used herein, the term "component" means any configuration of hardware, with or without software, which implements the functionality described in conjunction therewith using any solution, while the term "module" means program code that enables a computer system 20 to implement the functionality described in conjunction therewith using any solution. When fixed in a storage component 24 of a computer system 20 that includes a processing component 22, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of discovery program 30 fixed thereon (e.g., one or more modules 32). However, it is understood that computer system 20 and discovery program 30 are only representative of various possible equivalent computer systems that may perform a process described herein. To this extent, in other embodiments, the functionality provided by computer system 20 and discovery program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems, such as user system 12, user interface gadget provider 14, evaluation system 16, and/or the like, using any type of communications link. In either case, the communications link can comprise any combination of various types of wired and/or wireless links; comprise any combination of one or more types of networks; and/or utilize any combination of various types of transmission techniques and protocols. While not shown for clarity, user system 12, user interface gadget provider 14, and evaluation system 16 can be implemented using similar hardware configurations as shown and described herein with respect to computer system 20.

As discussed herein, discovery program 30 enables computer system 20 to select one or more user interface (UI) gadgets for inclusion in a customized user interface. In general, a UI gadget comprises an application, such as a mini application, that can be included as part of a user interface, such as a personal desktop, a web page (e.g., a homepage), and/or the like, to provide some desired functionality (e.g., news, calendar, stock quotes, weather, etc.) in the user interface. To this extent, computer system 20 can enable registration of one or more UI gadgets provided by a UI gadget provider 14. For each registered UI gadget, computer system 20 can manage UI gadget data 40, which includes various attributes on the corresponding UI gadget. Additionally, computer system 20 can manage evaluation data 42 corresponding to a registered UI gadget, which can be based on feedback/evaluations provided to one or more third party evaluation systems 16 by users 4 that have used the UI gadget. In general, computer system 20 can receive a set of required attributes for the customized user interface and select one or more registered UI gadgets for inclusion in the customized user interface using UI gadget data 40 and evaluation data 42.

FIG. 2 shows an illustrative data flow diagram for managing data regarding a UI gadget according to an embodiment. Initially, discovery system 20 (e.g., computer system 20 executing discovery program 30 as shown in FIG. 1) can obtain UI gadget information 44 regarding a UI gadget that is not currently registered with discovery system 20. UI gadget information 44 can be provided by a corresponding UI gadget provider 14 using any solution (e.g., provided in response to a request from discovery system 20, provided in an unsolicited manner, using a tagged mechanism, and/or the like). Alternatively, UI gadget information 44 could be provided to discovery system 20 by a trusted third party, such as a UI gadget portal, or the like.

In any event, UI gadget information 44 includes attribute data for the corresponding UI gadget. The attribute data can include, for example, data on the functionality provided by the UI gadget, data on the input(s) required by the UI gadget, data on the output(s) generated by the UI gadget, data on the display attributes of the UI gadget, and/or the like. Additionally, the attribute data can include information on a cost of using the UI gadget, requirements for using the UI gadget (e.g., execution environment, bandwidth, and/or the like), execution metrics of the UI gadget (e.g., update period, accuracy, etc.), and/or the like. Discovery system 20 can process the UI gadget information 44 and store some or all of the attribute data as UI gadget data 40 using any solution. When discovery system 20 includes UI gadget data 40 for a particular UI gadget, the UI gadget is considered registered with the discovery system 20. To this extent, a registered UI gadget is a UI gadget that discovery system 20 can select for possible use when attempting to identify a UI gadget capable of fulfilling a set of requirements.

For a registered UI gadget, discovery system 20 can obtain evaluation information 48 from one or more evaluation systems 16. Evaluation system 16 can comprise, for example, a web portal, at which various users 4 (FIG. 1) can provide feedback (e.g., ranking, rating, etc.) on various UI gadgets and/or aspects of the performance of the various UI gadgets. For example, discovery system 20 can provide UI gadget identification data 46 to an evaluation system 16, which can provide evaluation information 48, if any, on the identified UI gadget for processing by discovery system 20. The UI gadget identification data 46 can include any type of data, such as an identification of the UI gadget provider 14 and a name of the UI gadget, capable of uniquely identifying the UI gadget from other UI gadgets.

Evaluation system 16 can use the UI gadget identification data 46 to determine whether any evaluation information 48 is available, and if so, evaluation system 16 can provide the evaluation information 48 for processing by discovery system 20. The evaluation information 48 can include any type of evaluation, such as user rating(s) for one or more categories of functionality implemented by the UI gadget, a ranking of the UI gadget with respect to other comparable UI gadgets (e.g., using a number of downloads, a comparison of the UI gadgets by an expert, and/or the like), commentary on the UI gadget, and/or the like. Discovery system 20 can process the evaluation information 48 and store some or all of the evaluation information 48 as evaluation data 42 using any solution. In an embodiment, evaluation system 16 can calculate one or more evaluation metrics, such as an average user rating or the like, using the evaluation information, which can be stored as evaluation data 42.

Further, discovery system 20 can process the evaluation information 48 and/or information on the evaluation system 16 providing the evaluation information 48 to generate some or all of the evaluation data 42 using any solution. For example, discovery system 20 can quantize commentary and/or other evaluation information 48 to generate one or more values that can be used to compare various comparable UI gadgets. Additionally, discovery system 20 can apply a reliability factor or the like, which can correspond to the evaluation system 16 that provided the evaluation information 48 and/or the type of evaluation information (e.g., anonymous users versus expert), in generating the evaluation data 42 to adjust a relative contribution of each evaluation system 16 and/or the type of evaluation information 48 according to a perceived reliability. Still further, discovery system 20 can generate evaluation data 42 for a UI gadget based on a combination of evaluation information 48 received from multiple evaluation systems 16, e.g., by aggregating the evaluation information 48 using any solution (weighted or un-weighted).

Discovery system 20 can receive UI gadget information 44 and evaluation information 48 and update UI gadget data 40 and evaluation data 42 using any solution. For example, discovery system 20 can periodically query known UI gadget providers 14 for the existence of any new UI gadgets, which may not be currently registered. Further, discovery system 20 can query a UI gadget provider 14 to ensure that the UI gadget data 40 for a registered UI gadget remains accurate. Similarly, discovery system 20 can periodically query various evaluation systems 16 for new evaluation information 48 for a registered UI gadget, and update the stored evaluation data 42 in response to receiving new evaluation information 48 from one or more of the evaluation systems 16. Additionally, discovery system 20 can identify new UI gadgets, which can be registered, by querying evaluation systems 16 for information on the various UI gadgets that have been evaluated. Regardless, it is understood that discovery system 20 can use any automated, semi-automated, and/or manual solutions for discovering and registering UI gadgets as well as for generating and updating evaluation data 42 for the various UI gadgets.

As discussed herein, discovery system 20 can use UI gadget data 40 and evaluation data 42 to select user interface gadget(s) for inclusion in a customized user interface. To this extent, FIG. 3 shows an illustrative data flow diagram for generating a customized user interface 60 according to an embodiment. User system 12 can send a request for UI gadget (s) 50 for processing by discovery system 20. The request 50 can include a set of required attributes for generating the custom user interface 60. For example, the required attributes can include information on the type of data that is desired to be displayed in the user interface 60, a desired performance and/or cost for the user interface 60, data on the execution environment of user system 12, and/or the like. Discovery system 20 can process the UI gadget(s) request 50 to identify a set of possible UI gadgets for inclusion in the user interface 60. In particular, discovery system 20 can compare one or more of the required attributes in the request 50 to the stored UI gadget data 40 for the various registered user interface gadgets to identify the set of possible UI gadgets, if any, which can fulfill one or more of the required attributes without violating one or more of the required attributes.

When multiple possible user interface gadgets that will fulfill some or all of the required attributes are registered with discovery system 20, discovery system 20 can select one or more of the possible user interface gadgets using the stored evaluation data 42 for the possible user interface gadgets. For example, discovery system 20 can select a possible user interface gadget that has the highest average user rating or similar evaluation criteria for all of the possible user interface gadgets. In an embodiment, discovery system 20 implements an automated solution for selecting one of multiple possible user interface gadgets. Alternatively, discovery system 20 can implement a semi-automated or manual solution, which enables user 2 (FIG. 1) to view some or all of UI gadget data 40 and evaluation data 42 and select a user interface gadget.

Regardless, once selected, discovery system 20 can provide UI gadget(s) data 52 for use by user system 12 in generating the custom user interface 60. UI gadget(s) data 52 can include any type of data related to the selected UI gadget(s), which will enable user system 12 to include the UI gadget(s) 62A, 62B in custom user interface 60. For example, the UI gadget(s) data 52 can include information on how to access the UI gadget 62A, 62B, information on the input(s) required by and/or output(s) generated by the UI gadget 62A, 62B, cost and/or execution environment information, and/or the like.

User system 12 can generate the custom user interface 60 using the UI gadget(s) data 52. To this extent, the custom user interface 60 can include each UI gadget 62A, 62B, each of which can comprise a portlet or the like. User system 12 can obtain each UI gadget 62A, 62B from the corresponding UI gadget provider 14A, 14B, respectively. Further, depending on the type of UI gadget 62A, 62B, the UI gadget 62A, 62B can periodically obtain data from the corresponding UI gadget provider 14A, 14B, which is used to update the display of custom user interface 60.

In an embodiment, custom user interface 60 can include a UI gadget that queries discovery system 20 for an appropriate UI gadget 62A, 62B that meets a set of required attributes. For example, custom user interface 60 can include a button or the like, which when activated by a user 2 (FIG. 1) can generate a UI gadget(s) request 50 to query discovery system 20 for a UI gadget, receive UI gadget data 52, and obtain the UI gadget from the corresponding UI gadget provider 14A or 14B. Similarly, custom user interface 60 can include a UI gadget that can generate a UI gadget(s) request 50 to query discovery system 20 for a UI gadget, receive UI gadget data 52, and obtain the UI gadget from the corresponding UI gadget provider 14A or 14B each time custom user interface 60 is generated for display by user system 12. In either case, a UI gadget can be automatically and dynamically selected based on a set of required attributes and evaluation data 42 without any interaction from a user 2. In this manner, should a new UI gadget become the highest rated registered UI gadget, the custom user interface 60 can automatically select the new UI gadget without user 2 being aware of the change.

While shown and described herein as a method and system for configuring and generating a customized user interface, it is understood that aspects of the invention further provide various alternative embodiments. For example, in one embodiment, the invention provides a computer program fixed in at least one computer-readable medium, which when executed, enables a computer system to configure a customized user interface. To this extent, the computer-readable medium includes program code, such as discovery program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as discovery program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for configuring and/or generating a customized user interface. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A computer-implemented method of configuring a customized user interface, the method comprising:
   identifying a plurality of possible user interface gadgets for inclusion in the user interface using a first computer system, wherein the identifying compares a set of required attributes for the user interface to stored attribute data for a plurality of registered user interface gadgets;
   selecting at least one user interface gadget for inclusion in the user interface from the plurality of possible user interface gadgets using the first computer system, wherein the selecting uses stored evaluation data for the plurality of possible user interface gadgets; and
   providing data related to the selected at least one user interface gadget for use in generating the customized user interface on a second computer system distinct from the first computer system.

2. The method of claim 1, further comprising receiving a request for the user interface at the first computer system from the second computer system, the request including the set of required attributes.

3. The method of claim 1, further comprising:
   receiving attribute data for an unregistered user interface gadget at the first computer system; and
   storing the attribute data as attribute data for a new registered user interface gadget.

4. The method of claim 1, further comprising:
   obtaining evaluation information for a registered user interface gadget, wherein the evaluation information is provided by at least one evaluation system distinct from a provider of the registered user interface gadget; and
   processing and storing the evaluation information as evaluation data for the registered user interface gadget.

5. The method of claim 1, further comprising:
   periodically querying a plurality of evaluation systems for new evaluation information for a registered user interface gadget; and
   updating the stored evaluation data for the registered user interface gadget in response to the new evaluation information.

6. The method of claim 1, wherein the selecting selects a first user interface gadget provided by a first provider and a second user interface gadget provided by a second provider distinct from the first provider, and wherein the first user interface gadget provides data for use by the second user interface gadget.

7. The method of claim 1, wherein the evaluation data includes feedback from a plurality of users provided to at least one evaluation system, and wherein the selecting selects a user interface gadget having the highest feedback for inclusion in the user interface.

8. A computing environment for configuring a customized user interface, the environment comprising:
   a first computer system including:
      a component configured to identify a plurality of possible user interface gadgets for inclusion in the customized user interface, wherein the component configured to identify is configured to compare a set of required attributes for the customized user interface to stored attribute data for a plurality of registered user interface gadgets;
      a component configured to select at least one user interface gadget for inclusion in the customized user interface from the plurality of possible user interface gadgets, wherein the component configured to select is configured to use stored evaluation data for the plurality of possible user interface gadgets; and
      a component configured to provide data related to a selected at least one user interface gadget for use in generating the customized user interface on a second computer system distinct from the first computer system.

9. The computing environment of claim 8, the first computer system further including a component configured to receive a request for the customized user interface from the second computer system, the request including the set of required attributes.

10. The computing environment of claim 8, the first computer system further including:
    a component configured to receive attribute data for an unregistered user interface gadget at the first computer system; and
    a component configured to store the attribute data as attribute data for a new registered user interface gadget.

11. The computing environment of claim 8, the first computer system further including:
    a component configured to obtain evaluation information for a registered user interface gadget, wherein the evaluation information is provided by at least one evaluation system distinct from a provider of the registered user interface gadget; and
    a component configured to process and store the evaluation information as evaluation data for the registered user interface gadget.

12. The computing environment of claim 8, the first computer system further including:
    a component configured to periodically query a plurality of evaluation systems for new evaluation information for a registered user interface gadget; and
    a component configured to update the stored evaluation data for the registered user interface gadget in response to the new evaluation information.

13. The computing environment of claim 8, wherein the evaluation data includes feedback from a plurality of users provided to at least one evaluation system, and wherein the component configured to select is configured to select a user interface gadget having the highest feedback for inclusion in the customized user interface.

14. A computer program comprising program code embodied in at least one computer-readable medium, which when executed, enables a first computer system to implement a method of configuring a customized user interface, the method comprising:
    identifying a plurality of possible user interface gadgets for inclusion in the customized user interface, wherein the identifying compares a set of required attributes for the customized user interface to stored attribute data for a plurality of registered user interface gadgets;
    selecting at least one user interface gadget for inclusion in the customized user interface from the plurality of possible user interface gadgets, wherein the selecting uses stored evaluation data for the plurality of possible user interface gadgets; and
    providing data related to the selected at least one user interface gadget for use in generating the customized user interface on a second computer system distinct from the first computer system.

15. The computer program of claim 14, the method further comprising receiving a request for the customized user interface at the first computer system from the second computer system, the request including the set of required attributes.

16. The computer program of claim 14, the method further comprising:
    receiving attribute data for an unregistered user interface gadget at the first computer system; and
    storing the attribute data as attribute data for a new registered user interface gadget.

17. The computer program of claim 14, the method further comprising:
    obtaining evaluation information for a registered user interface gadget, wherein the evaluation information is provided by at least one evaluation system distinct from a provider of the registered user interface gadget; and
    processing and storing the evaluation information as evaluation data for the registered user interface gadget.

18. The computer program of claim 14, the method further comprising:
    periodically querying a plurality of evaluation systems for new evaluation information for a registered user interface gadget; and
    updating the stored evaluation data for the registered user interface gadget in response to the new evaluation information.

19. The computer program of claim 14, wherein the evaluation data includes feedback from a plurality of users provided to at least one evaluation system, and wherein the selecting selects a user interface gadget having the highest feedback for inclusion in the customized user interface.

20. A method of generating a computing environment for configuring a customized user interface, the method comprising:
    providing a first computer system operable to:
        identify a plurality of possible user interface gadgets for inclusion in the customized user interface, wherein the identifying compares a set of required attributes for the customized user interface to stored attribute data for a plurality of registered user interface gadgets;
        select at least one user interface gadget for inclusion in the customized user interface from the plurality of possible user interface gadgets, wherein the selecting uses stored evaluation data for the plurality of possible user interface gadgets; and
        provide data related to the selected at least one user interface gadget for use in generating the customized user interface on a second computer system distinct from the first computer system.

* * * * *